(12) United States Patent
De Angelis et al.

(10) Patent No.: US 10,877,571 B2
(45) Date of Patent: *Dec. 29, 2020

(54) DEVICE DRIVER-LEVEL APPROACH FOR UTILIZING A SINGLE SET OF INTERFACE INPUT DEVICES FOR MULTIPLE COMPUTING DEVICES

(71) Applicant: International Business Machines Corporation, Armonk, NY (US)

(72) Inventors: Fabio De Angelis, Rome (IT); Nicola Milanese, Rome (IT); Sandro Piccinini, Rome (IT); Sergio Tarchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,775

(22) Filed: Nov. 14, 2018

(65) Prior Publication Data

US 2019/0079595 A1 Mar. 14, 2019

Related U.S. Application Data (63) Continuation of application No. 13/153,759, filed on Jun. 6, 2011, now Pat. No. 10,133,361.

(51) Int. Cl.
*G06F 3/023* (2006.01)
*G06F 3/038* (2013.01)

(52) U.S. Cl.
CPC .............. *G06F 3/023* (2013.01); *G06F 3/038* (2013.01); *G09G 2370/24* (2013.01)

(58) Field of Classification Search
None
See application file for complete search history.

(56) References Cited

U.S. PATENT DOCUMENTS 5,758,110 A 5/1998 Boss et al.
6,557,170 B1 * 4/2003 Wilder .................... G06F 1/266
345/168

(Continued)

OTHER PUBLICATIONS

Mishra, Sanjeev, "Share Single Keyboard and Mouse With Multiple Computers Over Lan", Online: http://www.clickonf5.org/software/share-keyboard-mouse-multiple-comp.

(Continued)

*Primary Examiner* — Brian T Misiura
(74) *Attorney, Agent, or Firm* — Yee & Associates, P.C.

(57) ABSTRACT

A method for switching interface device input between computing devices can begin with connecting a primary computing device to a secondary computing device using a physical connector cable using the appropriate communications port of each computing device. An interface input control program can be configured to establish a unique interface trigger that defines a user-selected series of inputs that switches the primary computing device between a first input state and a second input state. Input from the interface input devices of the primary computing device can be interpreted by a device driver. In the first input state, the input can be directed to the operating system of the primary computing device. In the second input state, the input can be redirected to the secondary computing device via the physical connector cable, which can be recognized as having originated from local interface input devices.

19 Claims, 4 Drawing Sheets

(56) References Cited

U.S. PATENT DOCUMENTS

| | | | |
|---|---|---|---|
| 6,633,905 B1 * | 10/2003 | Anderson | G06F 1/26 709/219 |
| 6,671,756 B1 | 12/2003 | Thomas et al. | |
| 6,901,455 B2 | 5/2005 | Gough | |
| 7,136,993 B2 | 11/2006 | Bolen et al. | |
| 7,243,245 B2 | 7/2007 | Pagan | |
| 7,305,494 B2 | 12/2007 | Lee | |
| 7,545,361 B2 * | 6/2009 | Erickson | G06F 3/038 345/156 |
| 7,603,498 B2 | 10/2009 | Bishnoi et al. | |
| 7,689,724 B1 | 3/2010 | Hatton et al. | |
| 7,783,801 B2 | 8/2010 | Lin | |
| 7,904,633 B2 | 3/2011 | Abraham et al. | |
| 7,930,447 B2 | 4/2011 | Best et al. | |
| 8,028,108 B2 | 9/2011 | Batish et al. | |
| 8,037,191 B2 | 10/2011 | Lin et al. | |
| 8,516,171 B2 * | 8/2013 | Anderson | H04L 41/04 709/204 |
| 2003/0079055 A1 | 4/2003 | Chen | |
| 2005/0219202 A1 * | 10/2005 | Bishnoi | G06F 3/14 345/156 |
| 2006/0244724 A1 | 11/2006 | Erickson | |
| 2006/0253639 A1 * | 11/2006 | Lee | H04L 67/08 710/313 |
| 2006/0282576 A1 | 12/2006 | Hsu | |
| 2007/0094426 A1 * | 4/2007 | Chiang | G06F 3/023 710/73 |
| 2007/0152972 A1 | 7/2007 | Zhang | |
| 2007/0285394 A1 | 12/2007 | Lee et al. | |
| 2009/0044127 A1 | 2/2009 | Bates et al. | |
| 2009/0083453 A1 | 3/2009 | Hsueh et al. | |
| 2009/0300510 A1 | 12/2009 | Gantman et al. | |
| 2010/0049890 A1 | 2/2010 | Best et al. | |
| 2010/0097326 A1 * | 4/2010 | Liang | G06F 3/023 345/173 |
| 2010/0180055 A1 | 7/2010 | Lyon et al. | |
| 2010/0185797 A1 * | 7/2010 | Tsai | G06F 3/023 710/65 |
| 2011/0063222 A1 | 3/2011 | Chu et al. | |
| 2011/0173355 A1 * | 7/2011 | Charna | G06F 3/0227 710/67 |

OTHER PUBLICATIONS

Young, Eric, "Input Director—Software KVM to Control Multiple Computers", Online: hittp://www.inputdirector.com.

* cited by examiner

DEVICE DRIVER-LEVEL APPROACH FOR UTILIZING A SINGLE SET OF INTERFACE INPUT DEVICES FOR MULTIPLE COMPUTING DEVICES

CROSS-REFERENCE TO RELATED APPLICATION(S)

This application is a continuation of U.S. patent application Ser. No. 13/153,759, filing date Jun. 6, 2011, the entire contents of which are incorporated herein by reference.

BACKGROUND

In today's workplace, it is common for employees to utilize multiple computers and/or related computing devices. Software testers often utilize computers of varying configurations or platforms during testing and executives have a desktop in the office and a laptop for home or travel. A common problem when using multiple computing devices is that a user has to physically switch between the input devices (e.g., keyboard, mouse, touchpad, etc.) of the computing devices, even if the computing devices are sitting next to each other.

A variety of approaches exist that attempt to solve this problem; each approach solves the problem from a slightly different perspective. A keyboard, video, and mouse (KVM) switch is a hardware solution that unilaterally shares a single keyboard, display, and mouse between multiple computers. Simultaneous control of the connected computers is not possible with this solution nor is sharing of just the keyboard and mouse elements.

Software solutions, such as remote desktop systems, require the installation and maintenance of the software application on both computers as well as a network connection. Such solutions often incur additional overhead, aside from update maintenance, when used like performance latency due to network load, limited access to software applications and security issues due to network architecture. A simple solution to this problem is currently lacking in the conventional approaches, both hardware and software, that are currently available to users.

BRIEF SUMMARY

One aspect of the present invention can include a method for switching interface device input between computing devices. Such a method can begin with connecting a primary computing device to a secondary computing device using a physical connector cable. The physical connector cable can be connected to the appropriate communications port of each computing device. Data from the primary computing device can be conveyed to the secondary computing device via the physical connector cable. An interface input control program can be configured to establish a unique interface trigger that defines a user-selected series of inputs that switches the primary computing device between a first input state and a second input state. Upon receipt of input entered using the interface input devices of the primary computing device, the received input can be interpreted by a corresponding device driver associated with a configuration of the primary computing device and the interface input device generating the input. When the primary computing device is in the first input state representing local use of the interface input devices, the interpreted input can be directed to the operating system of the primary computing device for further handling. When the primary computing device is in the second input state representing remote use of the interface input devices, the interpreted input can be redirected by the interface input control program to the secondary computing device via the physical connector cable for further handling. The secondary computing device can recognize the interpreted input received over the physical connector cable as having originated from interface input devices local to the secondary computing device.

Another aspect of the present invention can include a system for switching interface device input between computing devices. Such a system can include a primary computing device, secondary computing devices, a one universal serial bus (USB) connector cable, and an interface input control program. The primary computing device can have connected interface input devices and a USB communications port available. The primary computing device can utilizes a device driver program to interpret input from the interface input devices. The secondary computing devices can have a USB communications port available and a configuration of the secondary computing devices can be capable of utilizing the interface input devices of the primary computing device. The USB connector cable can connect the primary computing device to the secondary computing devices using the available USB communications ports. The interface input control program can be configured to, upon receipt of a user-specified command, redirect the input interpreted by the device driver program via the USB connector cable to a user-specified secondary computing device. The redirected input can be recognized as having originated from interface input devices connected to the available USB communications port of the user-specified secondary computing device.

Yet another aspect of the present invention can include a computer program product that includes a computer readable storage medium having embedded computer usable program code. The computer usable program code can be configured to accept definition of a unique interface trigger that defines a user-selected series of inputs that switches a primary computing device between a first input state and a second input state. The computer usable program code can be configured to, when the primary computing device is in the first input state representing local use of the interface input devices, allow input generated by the interface input devices to be handled by an operating system of the primary computing device. The computer usable program code can be configured to, when the primary computing device is in the second input state representing remote use of the interface input devices, redirect input generated by the interface input devices of the primary computing device to the secondary computing device. The input can be transmitted across a physical connector cable from the primary computing device to the secondary computing device. The input can be interpreted by a device driver on the primary computing device prior to transmission. The secondary computing device can recognize the input received over the physical connector cable as having originated from interface input devices local to the secondary computing device.

DETAILED DESCRIPTION

The present invention discloses a solution for using a single set of interface input devices to control multiple computing devices. An interface input control program can be configured on a primary computing device. Configuration of the interface input control program can include the definition of an interface trigger that signifies a change in which computing device is to handle the inputs of the interface input devices connected to the primary computing device. A secondary computing device can be connected to the primary computing device using a physical connector cable. Upon entry of the interface trigger by a user, the inputs of the interface input devices can be redirected to control the secondary computing device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
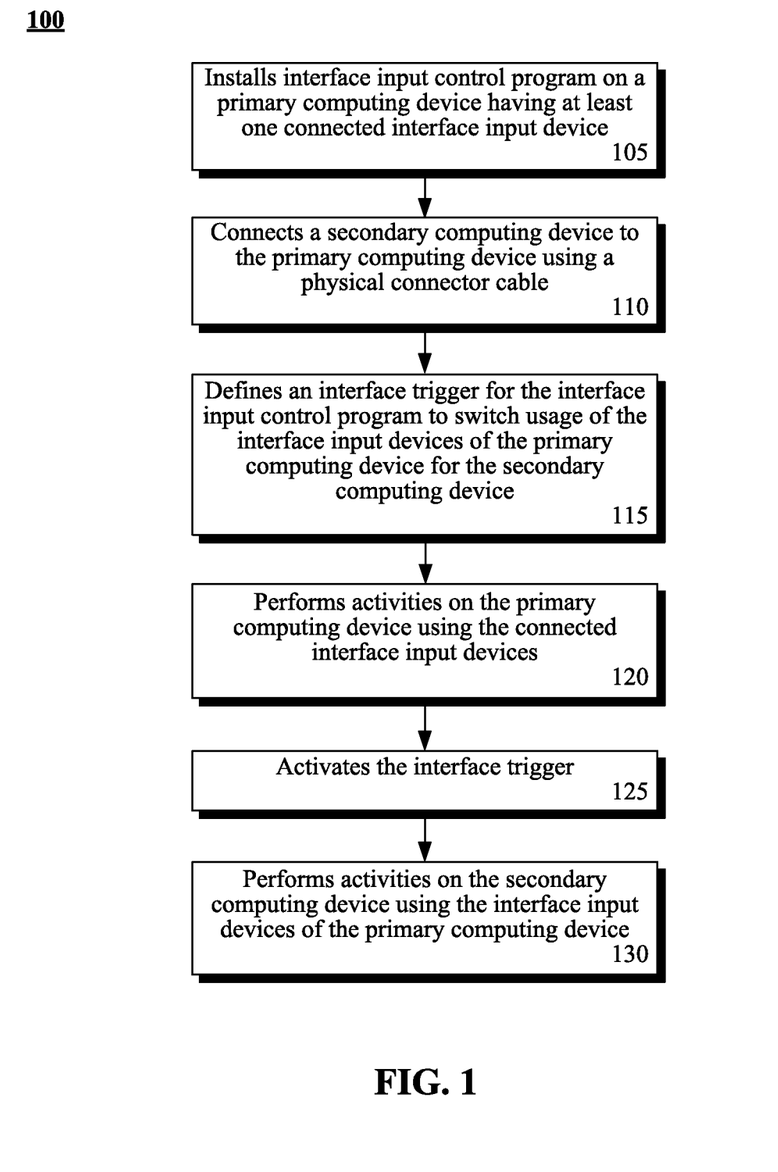
FIG. 1 is a flow chart of a method describing the basic functionality provided by the interface input control program from a user's perspective in accordance with embodiments of the inventive arrangements disclosed herein.

FIG. 1 is a flow chart of a method 100 describing the basic functionality provided by the interface input control program from a user's perspective in accordance with embodiments of the inventive arrangements disclosed herein.

Method 100 can begin in step 105 where the user can install the interface input control program on a primary computing device to which at least one interface input device is connected. The primary computing device can represent a variety of electronic devices such as a desktop computer, a laptop computer, a tablet computer, a micro-computer, a notebook computer, and the like.

An interface input device can represent an electronic device configured to provide input signals to a computing device. Examples of an interface input device can include, but are not limited to, a keyboard, a mouse, a trackball, a game pad, a keypad, a touchpad, a joystick, a microphone, a remote control, and the like.

The interface input devices can be internally connected to the primary computing device, as is the keyboard and touchpad of a laptop computer, or externally connected using the connector cable of the interface input device and the appropriate communications port of the primary computing device like a universal serial bus (USB) keyboard connected to a USB port of a desktop computer.

In step 110, a secondary computing device can be connected to the primary computing device using a physical connector cable. Like the primary computing device, the secondary computing device can represent a variety of electronic devices such as a desktop computer, a laptop computer, a tablet computer, a micro-computer, a notebook computer, and the like. The secondary computing device can also have one or more interface input devices that are externally and/or internally connected.

Further, the secondary computing device can be proximately located to the primary computing device based on the length of the physical connector cable. For example, a laptop computer (secondary computing device) can be connected to a desktop computer (primary computing device) using a USB connector cable. Thus, placement of the laptop with respect to the desktop computer can be limited by the length of the USB connector cable.

An interface trigger can then be defined by the user in order to use the interface input devices of the primary computing device for the secondary computing device in step 115. The interface trigger can represent a series of inputs that, when entered, indicates that the user wishes to utilize the interface input devices of the primary computing device for the secondary computing device.

Steps 110 and 115 can be considered as temporally independent of each other, and, as such, the actions of steps 110 and 115 can be performed in reverse (i.e., step 115 can be performed before step 110). Further, if the interface input control program is configured to store interface triggers, step 115 can be performed once for each secondary computing device and need not be required for each iteration of method 100.

In step 120, the user can perform typical activities on the primary computing device using the connected interface input devices. When desired, the user can activate the interface trigger in step 125. Then, in step 130, the user can perform activities on the secondary computing device using the interface input devices of the primary computing device instead of the interface input devices already connected to the secondary computing device.

For example, the primary computing device can be a desktop computer having a keyboard and mouse connected to USB ports. A laptop computer that has an integrated keyboard and touchpad can represent the secondary computing device. The desktop computer and laptop computer can be connected using a USB cable.

The user can then use the keyboard and/or mouse of the desktop computer, performing various tasks (e.g., word processing, Web surfing, etc.). Once the user enters the interface trigger, any actions performed with the keyboard and/or mouse of the desktop computer can be executed by the laptop computer. That is, as an example, the motions made with the mouse can move the mouse pointer shown on the display of the laptop computer.

The activities performed by the user on the secondary computing device in step 130 can be rendered on a display that is locally-connected to the secondary computing device or to the display used by the primary computing device, provided that the appropriate cabling (e.g., a VGA Y-splitter cable) is available and the display is usable by the secondary computing device.

Further, depending upon the specific implementation of the interface input control program, step 130 can be expanded to also allow the activities of the user to be performed on both the primary and secondary computing devices, simultaneously, using the input from only the interface input devices of the primary computing device.

For example, in a software testing environment, a software application is often tested according to predefined test cases by a user on computing devices of varying configurations. When a test case is to be performed manually by the user, the user would need to reiterate all the mouse-clicks and data entry for each computing device. However, using the interface input control program, the user can connect the computing devices and perform the tasks of the test case in a single iteration, since the keyboard and mouse inputs would be simultaneously executed on all of the connected computing devices.

From the perspective of the user, use of the interface input control program can provide many benefits over conventional approaches available for the sharing of a single set of interface input devices between multiple computing devices. Firstly, the interface input control program can be required on only one of the connected computing devices, unlike existing software systems that utilize a client/server or master/slave architecture that require installation of software elements on both computing devices (i.e., remote desktop or desktop virtualization). Since the input devices are recognized as local USB input devices by the secondary computer, another benefit is that the input devices of the primary computer are active on the secondary computer also at boot time. Thus the keyboard of the primary computer device can be used to type the power on password to the secondary computer device.

Since the primary and secondary computing devices communicate over a physical connector cable, the approach of the present disclosure can circumvent problems associated with the network configurations and privileges. Conventional approaches like remote desktop systems can be meant for use with computing devices that are part of a fairly complex medium or large-sized network, such as an enterprise network. Complexities in network security can require a large amount of overhead in order for a user to simply be able to use one set of input devices for multiple computing devices.

Additionally, a user utilizing a conventional network-centric approach to control a secondary computing device can experience performance latencies due to bandwidth availability and the level of network traffic. The approach of the present disclosure can avoid this problem since the computing devices communicate over a dedicated connector cable.

Hardware solutions like keyboard, video, and mouse (KVM) switches can allow the sharing of a single set of external devices among multiple computing devices. While a KVM switch can be a viable solution is some situations, its use can be restrictive and exacting. That is, computing devices that utilize a KVM switch will all share the same keyboard, display, and mouse; the user cannot elect to share only the keyboard and mouse, leaving the state the video display of each computing device suspended while switched.

Figure 2:
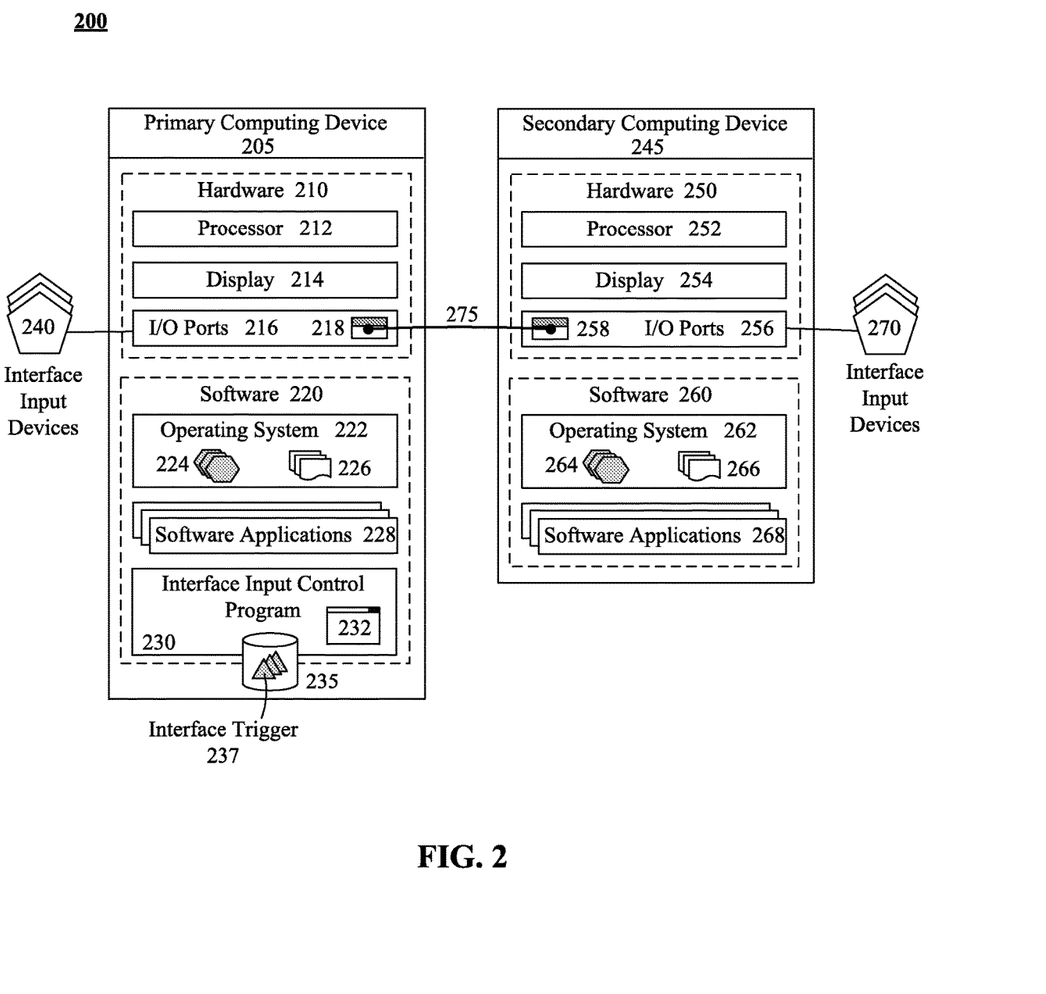
FIG. 2 is a schematic diagram illustrating a system that utilizes the interface input control program in accordance with an embodiment of the inventive arrangements disclosed herein.

FIG. 2 is a schematic diagram illustrating a system 200 that utilizes the interface input control program 230 in accordance with embodiments of the inventive arrangements disclosed herein. In system 200, the interface input control program 230 can allow the input from the interface input devices 240 of a primary computing device 205 to be utilized by a secondary computing device 245.

As previously mentioned, the primary computing device 205 and the secondary computing device 245 can represent a variety of electronic devices such as a desktop computer, a laptop computer, a tablet computer, a micro-computer, a notebook computer, and the like.

It should be noted that the primary and secondary computing devices 205 and 245 can have a variety of configurations that utilize various combinations of components. As such, only the basic components necessary to realize this embodiment of the present disclosure have been shown in system 200, and these configurations are not meant as a limitation to the embodiments of the present disclosure in any way.

Both the primary and secondary computing devices 205 and 245 can be comprised of hardware 210 and 250 and software 220 and 260 components, respectively. The hardware 210 and 250 can represent the physical electronic components of the primary and secondary computing devices 205 and 245 and can include a processor 212 and 252, display 214 and 254, and input/output (I/O) ports 216 and 256.

Since the functionality of these hardware 210 and 250 components is common in the art, they will not be discussed in great detail. The processor 212 and 252 can represent the primary functional element that executes the instructions of a computer program (i.e., central processing unit (CPU)). The display 214 and 254 can correspond to monitor or screen upon which data can be visually presented.

The I/O ports 216 and 256 can be the specialized receptacles (e.g., a parallel port, a USB port, etc.) to which the connectors of various I/O devices can be attached, such as the display 214 and 254 and interface input devices 240 and 270. Using available I/O ports 216 and 256, an appropriate physical connector cable 275 can be used to establish communication between the primary and secondary computing devices 205 and 245.

As shown in system 200, communication between the primary and secondary computing devices 205 and 245 can use a USB connector cable 275 connected to a USB port 218 and 258 of each computing devices 205 and 245.

In another contemplated embodiment, the physical connector cable 275 can be of a type that connects to a serial I/O port 216 on the primary computing device 205 and a USB port 258 on the secondary computing device 245.

The interface input devices 240 and 270, as previously mentioned, can represent an electronic device configured to provide input signals to the primary and/or secondary computing devices 205 and 245. Examples of an interface input device can include, but are not limited to, a keyboard, a mouse, a trackball, a game pad, a keypad, a touchpad, a joystick, a microphone, a remote control, and the like.

In system 200, the interface input devices 240 and 270 can be external to the primary and secondary computing devices 205 and 245 (i.e., a USB keyboard and mouse). However, it should be noted that this embodiment of the present disclosure is also applicable to interface input devices 240 and 270 that are integrated components of the primary and/or secondary computing devices 205 and 245.

For example, the primary and secondary computing device 205 can be a desktop computer that requires an externally-connected keyboard, while the secondary computing device 245 can be a laptop computer with an integrated keyboard, and vice versa.

The software 220 and 260 components of the primary and secondary computing devices 205 and 245 can represent the machine-readable instructions that can be executed by the processor 212 and 252. The software 220 and 260 components common to both computing devices 205 and 245 can include an operating system 222 and 262 and software applications 228 and 268.

The basic concepts of an operating system 222 and 262 and a software application 228 and 268 are well known by those versed in the art, and will not be discussed in detail. The operating system 222 and 262 can represent the computer program and data that manages the basic functionality of the primary and secondary computing devices 205 and 245.

It is important to note that the operating system 222 of the primary computing device 205 can be different than the operating system 262 of the secondary computing device 245. That is, the primary computing device 205 can use a UNIX-based operating system 222, while the secondary computing device 245 can utilize a WINDOWS-based operating system 262, or vice versa.

In system 200, the operating system 222 and 262 of the primary and secondary computing devices 205 and 245 can be of a configuration that supports the use of device controllers 224 and 264 and device drivers 226 and 266. A device controller 224 and 264 can exist for each I/O port 216 and 256 of the computing devices 205 and 245. The device controller 224 and 264 can handle input signals from the connected interface input devices 240 and 270 and utilize the appropriate device driver 226 and 266 to translate the input signal into the appropriate instructions for the operating system 222 and 262.

A device driver 226 and 266 can be a computer program that translates input from an interface input device 240 and 270 so it can be executed by the operating system 222 and 262 and/or target software application 228 and 268 as well as translate input from a software application 228 and 268 to affect a change in the corresponding hardware component 210 and 250. With respect to this embodiment of the present disclosure, the device controllers 224 and device drivers 226 of the primary computing device 205 can translate the input received from the interface input devices 240.

The software applications 228 and 268 can represent computer programs that provide functionality additional to that of the operating system 222 and 262 for a user of the primary and secondary computing devices 205 and 245. Examples of common software applications 228 and 268 can include, but are not limited to, word processing applications, spreadsheet applications, Web browsers, software games, electronic communications applications, and the like.

The primary computing device 205 can also have an interface input control program 230 an as a software 220 component. The interface input control program 230 can control which computing device and/or devices 205 and 245 execute the inputs received from the interface input devices 240 of the primary computing device 205. The interface input control program 230 can direct input that has been translated by the appropriate device driver 226 of the primary computing device 205.

The interface input control program 230 can include a user interface 232 and a data store 235 for storing interface triggers 237. The user interface 232 can represent an interaction mechanism that a user can utilize to define the interface trigger 237 for switching between the primary and secondary computing devices 205 and 245.

The interface trigger 237 can be a user-selected series of inputs that indicates that the target for the input of the interface input devices 240 should be changed. Interface triggers 237 can be abstractly thought of as changing the input state of the primary computing device 205.

For example, input state "A" can represent only the local use of the interface input devices 240 by the primary computing device 205 and can be associated with an entry string of "Alt-1"; input state "B" can represent only the remote use of the interface input devices 240 by the secondary computing device 245 and can be associated with an entry string of "Alt-2"; and, input state "C" can represent the simultaneous use of the interface input devices 240 by both the primary and secondary computing devices 205 and 245 and can be associated with an entry string of "Alt-3".

Interface triggers 237 can be stored in accordance with a variety of architectures and/or combinations of environmental data. For example, a user can store interface triggers 237 for different secondary computing devices 245 in a user profile local to the primary computing device 205. Alternately, a single interface trigger 237 can be used to cycle through the defined input states.

In another embodiment, the interface input control program 230 can also include an input translation component (not shown) to handle the conversion of input data from the type of the I/O port 216 that the interface input device 240 is connected to the type required by the I/O port 218 that the physical connector cable 275 is connected.

For example, the input from a keyboard 240 that uses a serial port 216 to connect to the primary computing device 205 would need to be converted to the USB communications specification before being sent to the USB port 218 and over the USB connector cable 275 to the secondary computing device 245.

As used herein, presented data store 235 can be a physical or virtual storage space configured to store digital information. Data store 235 can be physically implemented within any type of hardware including, but not limited to, a magnetic disk, an optical disk, a semiconductor memory, a digitally encoded plastic memory, a holographic memory, or any other recording medium. Data store 235 can be a stand-alone storage unit as well as a storage unit formed from a plurality of physical devices. Additionally, information can be stored within data store 235 in a variety of manners. For example, information can be stored within a database structure or can be stored within one or more files of a file storage system, where each file may or may not be indexed for information searching purposes. Further, data store 235 can utilize one or more encryption mechanisms to protect stored information from unauthorized access.

Figure 3:
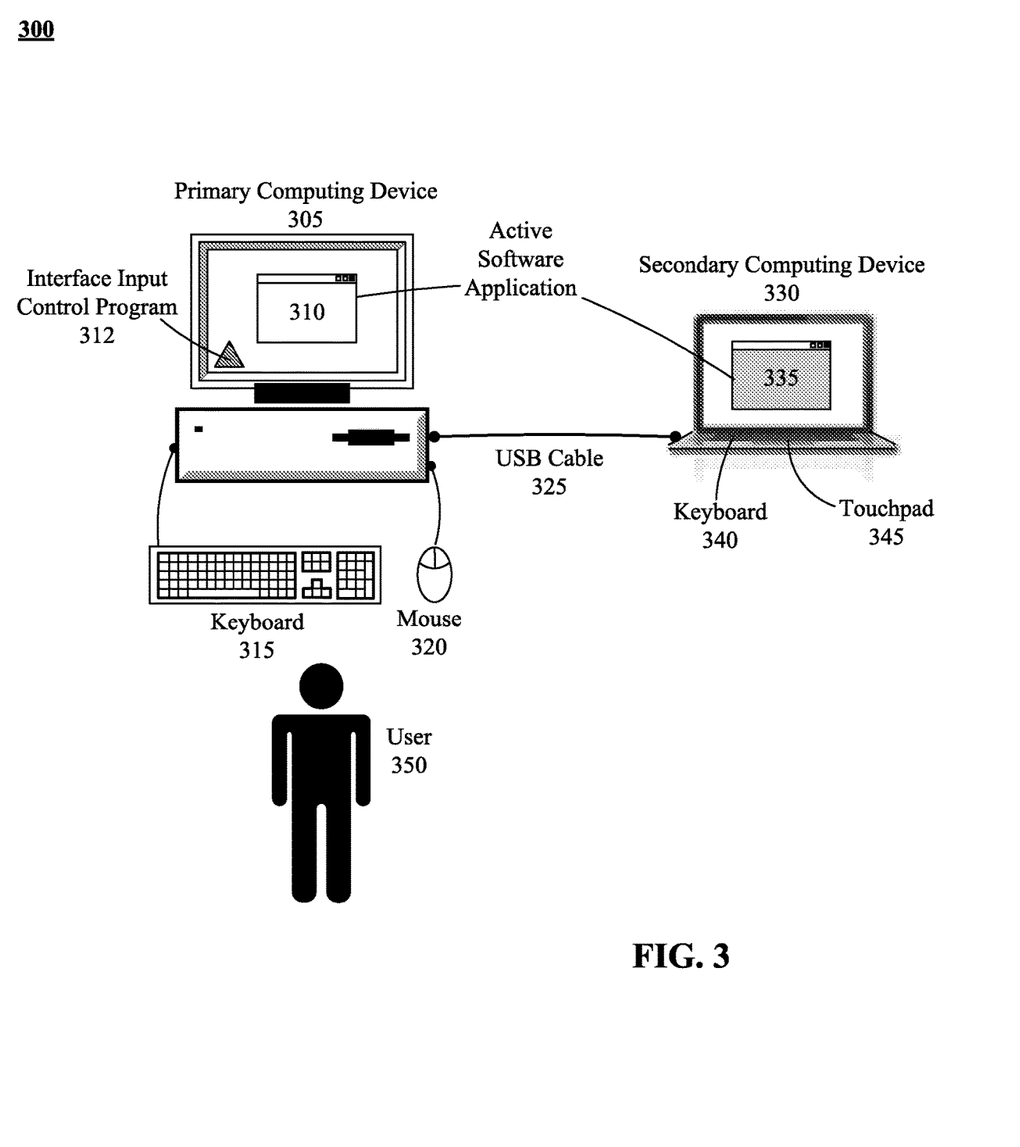
FIG. 3 illustrates an example configuration for using the interface input control program in accordance with embodiments of the inventive arrangements disclosed herein.

FIG. 3 illustrates an example configuration 300 for using the interface input control program 312 in accordance with embodiments of the inventive arrangements disclosed herein. The example configuration 300 can perform the steps of method 100 and/or represent a specific embodiment of system 200.

In the example configuration 300, the user 350 can utilize a primary computing device 305 represented by a typical desktop computer and a typical laptop computer as a secondary computing device 330. A keyboard 315 and a mouse 320 can be connected to the primary computing device 305 to allow the user 350 to perform computing tasks like executing functions of an active software application 310.

The active software application 310 can represent a variety of computer programs supported by the primary computing device 305 and capable of receiving input from the user 350 via the keyboard 315 and/or mouse 320. The interface input control program 312 can operate in the background of the primary computing device 305.

It should be noted that the interface input control program 312 need not be overtly displayed on the primary computing device 305 when active, and that the inclusion of the graphic representation of the interface input control program 312 in the example configuration 300 is for discussion purposes only.

For example, an icon associated with the interface input control program 312 can be displayed in the "system tray" of the primary computing device 305 and the full user interface for the interface input control program 312 may be presented only when that icon is selected by the user 350.

The secondary computing device 330 can have an integrated keyboard 340 and touchpad 345 to receive input. The secondary computing device 330 can be connected to the primary computing device 305 using a USB cable 325.

Using the example configuration 300, the user 350 can interact with the active software application 310 on the primary computing device 305 using the attached keyboard 315 and/or mouse 320. Then, by entering the interface trigger, the user 350 can interact with the active software application 335 running on the secondary computing device 330 using the keyboard 315 and mouse 320 of the primary computing device 305.

Without the use of the interface input control program 312, the user 350 would need to physically move from the primary computing device 305 to the secondary computing device 330 and use the keyboard 340 and touchpad 345 of the secondary computing device 330.

Example configuration 300 can be particularly beneficial for users 350 who utilize multiple computing devices 305 and 330 to perform business tasks. For example, a businessman 350 may have a desktop computer 305 in his office that is connected to the organization's network. He may also use a laptop computer 330 when traveling or conducting meetings outside of the office. Therefore, the laptop computer 330 can be configured to include different software applications 335 than the desktop computer 305.

When the businessman 350 returns from a meeting, he may need to access data collected during the meeting from a data collection application 335 as he fills out a report form in a feedback application 310 on the desktop computer 305. Using example configuration 300, the businessman 350 can save the time he would spend readjusting himself to the differences in the keyboards 315 and 340 and pointer devices 320 and 345 of the separate computers 305 and 330 and simply use only the keyboard 315 and mouse 320 of the primary computing device 305.

Additionally, since the input sent to the secondary computing device 330 over the USB cable 325 is in the format of a USB keyboard 315 and/or mouse 320, regardless of what port these devices 315 and 320 use to connect to the primary computing device 305, the secondary computing device 330 can be unaware that the keyboard 315 and mouse 320 is not locally-connected. That is, the secondary computing device 330 can recognize input received from the keyboard 315 and/or mouse 320 of the primary computing device 305 as being generated by the corresponding devices that are locally-connected to USB ports of the secondary computing device 330.

Figure 4:
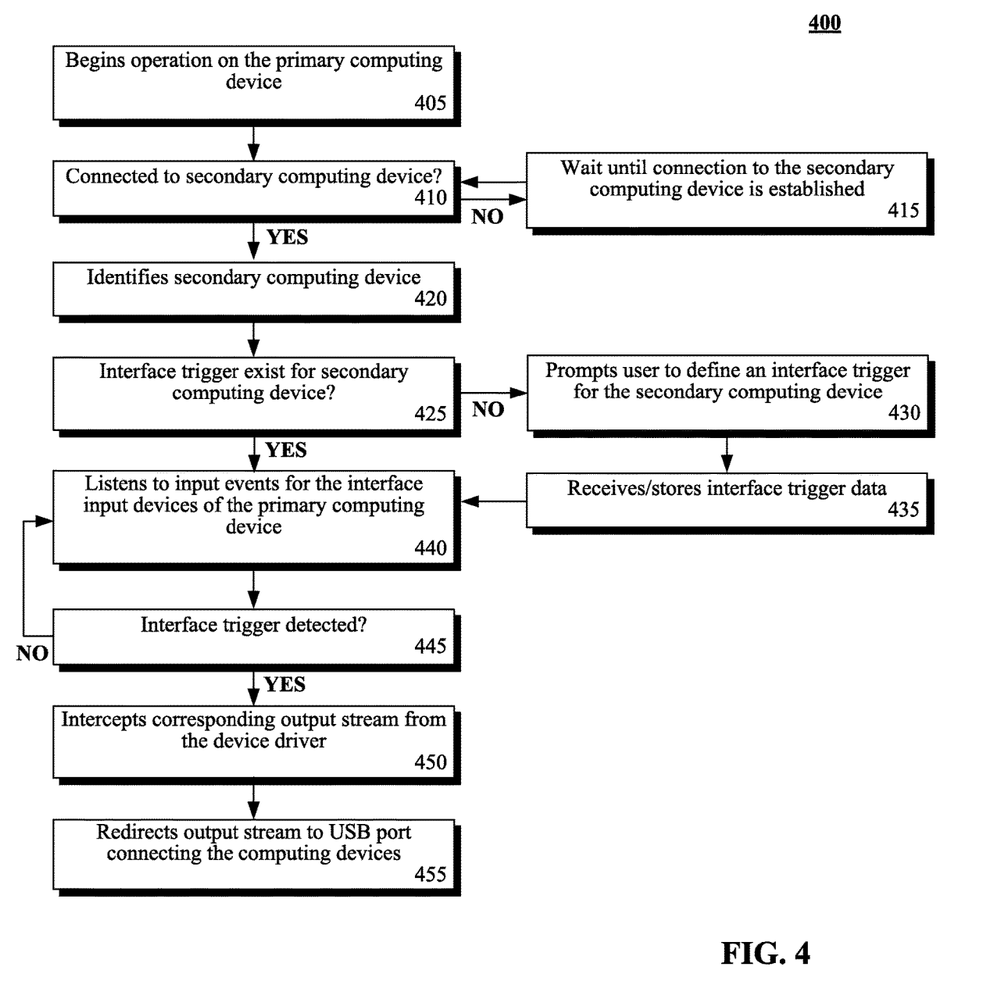
FIG. 4 is a flow chart of a method 400 detailing the operation of the interface input control program in accordance with embodiments of the inventive arrangements disclosed herein.

FIG. 4 is a flow chart of a method 400 detailing the operation of the interface input control program in accordance with embodiments of the inventive arrangements disclosed herein. Method 400 can be performed within the context of method 100, and/or in conjunction with system 200.

Method 400 can begin in step 405 where the interface input control program can begin operation on the primary computing device. Step 405 can be executed manually by the user (i.e., launched using a program icon) or automatically by the primary computing device (i.e., configured to automatically launch when the primary computing device is booted).

It can be determined if the primary computing device is connected to a secondary computing device in step 410. It should be noted that the interface input control program can be configured for use with multiple secondary computing devices physically connected to the primary computing device to switch between and/or simultaneously control.

When it is determined that the primary computing device is not connected to a secondary computing device (i.e., port polling), step 415 can execute where the interface input control program can wait until a connection to a secondary computing device is established. The interface input control program can loop between steps 410 and 415 until a connection to a secondary computing device is recognized.

When it is determined that the primary computing device is connected to a secondary computing device, the secondary computing device can be identified in step 420. Identification of the secondary computing device can provide the data like the secondary computing device's identifier and configuration.

In step 425, it can be determined if an interface trigger already exists for the secondary computing device. Step 425 can assume that the interface input control program includes and/or has access to the hardware and/or software components necessary to permanently store user-entered interface triggers in a physical memory location.

When it is determined that an interface trigger does not exist for the secondary computing device, the interface input control program can prompt the use to define an interface trigger for the secondary computing device on step 430. In step 435, data for the interface trigger can be received and stored by the interface input control program.

In an embodiment where interface triggers are not permanently stored, flow from step 425 can bypass step 430 and execute step 435 with the interface trigger data being stored in a temporary memory store.

Upon completion of step 435 or when it is determined that an interface trigger does already exist for the secondary computing device, step 440 can execute where the interface input control program can listen to the input events generated by the interface input devices of the primary computing device.

Detection of the interface trigger for the secondary computing device can be determined in step 445. When the interface trigger is not detected, the interface input control program can continue listening to the input events by looping back to step 440.

When the interface trigger is detected, step 450 can execute where the output stream of the device driver of the interface input device is intercepted as it is being sent to the operating system of the primary computing device. The interface input control program can then redirect the intercepted output stream to the USB port that connects the computing devices in step 455.

It should be noted that the steps of method 400 describe a change in the input state of the primary computing device from only the primary computing device using the inputs of the interface input devices to the inputs being used only the secondary computing device. Method 400 can be expanded upon to handle transitions between the various input states supported by the specific implementation of the interface input control program without departing from the spirit of the present disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for switching interface device input between computing devices comprising:
configuring an interface input control program to establish a unique interface trigger, wherein said unique interface trigger defines a user-selected series of inputs that switches a primary computing device between a first input state representing local use of at least one interface input device and a second input state representing remote use of the at least one interface input device;
upon receipt of input entered using the at least one interface input device of a primary computing device, interpreting of said received input by a corresponding device driver on the primary computing device associated with a configuration of the primary computing device and the at least one interface input device generating the input;
when the primary computing device is in the first input state representing local use of the at least one interface input device, directing interpreted input to an operating system of the primary computing device for further handling;
when the primary computing device is in the second input state representing remote use of the at least one interface input device, redirecting the interpreted input by the interface input control program to the secondary computing device via a physical connector cable to interact with an application program running on the secondary computing device instead of using an interface input device connected to the secondary computing device to interact with the application program, wherein when the primary computing device is in the second state, in addition to redirecting the interpreted input by the interface input control program to the secondary computing device, directing the interpreted input to the operating system of the primary computing device for further handling, and wherein redirecting the interpreted input further comprises:
intercepting of the interpreted input by the interface input control program as said interpreted input is being conveyed from the device driver to the operating system of the primary computing device; and
conveying the intercepted interpreted input to the communications port of the primary computing device to which the physical connector cable is connected.

2. The method of claim 1, further comprising:
connecting the primary computing device having the at least one interface input device to the secondary computing device using the physical connector cable, wherein the physical connector cable is connected to an appropriate communications port of each computing device, wherein data from the primary computing device is conveyed to the secondary computing device via the physical connector cable, and wherein a type of operating system of the secondary computing device is different than a type of the operating system of the primary computing device.

3. The method of claim 2, wherein the secondary computer device comprises an integrated keyboard and display.

4. The method of claim 1, wherein said steps of the method are applied to a plurality of secondary devices, wherein a quantity of different unique interface triggers and input states correspond to the plurality of secondary computing devices.

5. The method of claim 1, further comprising:
identifying of the interpreted input as the unique interface trigger by the interface input control program;
switching of an input state of the primary computing device by the interface input control program, wherein said switch results in at least one of moving the primary computing device from the first input state to the second input state and moving the primary computing device from the second input state to the first input state; and
using the at least one interface input device of the primary computing device to enter a power on password to the secondary computing device.

6. The method of claim 5, wherein identifying of the interpreted input further comprises:
requesting confirmation for the switch in input state of the primary computing device;
when confirmation of the input state switch is received, proceeding with the switching of the input state of the primary computing device; and
when rejection of the input state switch is received, dismissing the identification of the unique interface trigger, wherein the input state of the primary computing device remains unchanged.

7. The method of claim 1, wherein, when in the second input state, inputs received by the secondary computing device from locally-connected interface input devices connected to the secondary computing device are ignored.

8. The method of claim 1, wherein configuring of the interface input control program allows definition of a secondary unique interface trigger that switches the primary computing device to a third input state from the first or second input state, said method further comprising:
when the primary computing device is in a third input state representing simultaneous local and remote use of the at least one interface input device, directing of the interpreted input by the interface input control program to the operating systems of the primary computing device and the secondary computing device, wherein said interpreted input is simultaneously executed on both the primary computing device and the secondary computing device.

9. A method for switching interface device input between computing devices comprising:
configuring an interface input control program to establish a unique interface trigger, wherein said unique interface trigger defines a user-selected series of inputs that switches a primary computing device between a first input state representing local use of at least one interface input device and a second input state representing remote use of the at least one interface input device;
upon receipt of input entered using the at least one interface input device of a primary computing device, interpreting of said received input by a corresponding device driver on the primary computing device associated with a configuration of the primary computing device and the at least one interface input device generating the input;
when the primary computing device is in the first input state representing local use of the at least one interface input device, directing interpreted input to an operating system of the primary computing device for further handling;
when the primary computing device is in the second input state representing remote use of the at least one interface input device, redirecting the interpreted input by the interface input control program to the secondary computing device via a physical connector cable to interact with an application program running on the secondary computing device instead of using an interface input device connected to the secondary computing device to interact with the application program, wherein the at least one interface input device comprises at least one of a keyboard, a mouse, a trackball, a game pad, a keypad, a touchpad, a joystick, and a remote control, and wherein each of the at least one interface input device has an associated device controller configured to handle input signals from the each of the at least one interface input device and utilize an appropriate device driver to translate the input signals into appropriate instructions (i) for the operating system of the primary computing device when the primary computing device is in the first state and (ii) for a second operating system of the secondary computing device when the primary computing device is in the second state.

10. The method of claim 9, wherein, when a data type of the interpreted input is different from the data type of the communications port to which the physical connector cable is connected, redirecting of the interpreted input further comprises:
identifying of a difference in a data type of the interpreted input and the data type of the communications port to which the physical connector cable is connected by the interface input control program; and
converting the interpreted input to the data type required by the communications port of the physical connector cable.

11. The method of claim 10, wherein said conversion requires use of a specialized translation component, wherein said specialized translation component is an integrated element of the interface input control program.

12. A system for switching interface device input between computing devices comprising:
a primary computing device having at least one connected interface input device and at least one communications port available, wherein said primary computing device utilizes a device driver program to interpret input from the at least one connected interface input device;

at least one secondary computing device having at least one communications port available, wherein the at least one interface input device used by the primary computing device is capable of being utilized in a configuration of the at least one secondary computing device;

a connector cable connecting the primary computing device to the at least one secondary computing devices using available communications ports;

a unique interface trigger defined for the at least one secondary computing device, wherein said unique interface trigger represents a user-selected series of inputs made with the at least one interface input device of the primary computing device to indicate an operational interrupt; and an interface input control program configured to, upon receipt of the unique interface trigger, redirect the input interpreted by the device driver program via the connector cable to the at least one secondary computing device to interact with an application program running on the at least one secondary computing device instead of using an interface input device connected to the at least one secondary computing device to interact with the application program;

wherein the interface input control program is further configured to establish the unique interface trigger, wherein said unique interface trigger defines the user-selected series of inputs that switches the primary computing device between a first input state representing local use of at least one interface input device and a second input state representing remote use of the at least one interface input device, wherein the at least one interface input device of the primary computing device comprises at least one of a keyboard, a mouse, a trackball, a game pad, a keypad, a touchpad, a joystick, a microphone, and a remote control, and wherein each of the at least one interface input device has an associated device controller configured to handle input signals from the each of the at least one interface input device and utilize an appropriate device driver to translate the input signals into appropriate instructions (i) for the operating system of the primary computing device when the primary computing device is in the first state and (ii) for a second operating system of the secondary computing device when the primary computing device is in the second state.

13. The system of claim 12, wherein, when the at least one interface input device is connected to the primary computing device using a serial communications port, the interface input control program further comprises:

an input conversion component configured to translate the interpreted input from a data type associated with a serial communications port to the data type associated with the communications port.

14. The system of claim 12, wherein the interface input control program further comprises:

a user interface configured to accept user-entered data defining the user-selected series of inputs, and wherein a type of operating system of the secondary computing device is different than a type of the operating system of the primary computing device.

15. A computer program product comprising a non-transitory computer readable storage medium having computer usable program code embodied therewith, the computer usable program code comprising:

computer usable program code configured to accept definition of and establish a unique interface trigger, wherein said unique interface trigger defines a user-selected series of inputs that switches a primary computing device between a first input state and a second input state;

computer usable program code configured to, when the primary computing device is in the first input state representing local use of at least one interface input device, allow input generated by the at least one interface input device to be handled by an operating system of the primary computing device; and computer usable program code configured to, when the primary computing device is in the second input state representing remote use of the at least one interface input device, redirect input generated by the at least one interface input device of the primary computing device to the secondary computing device to interact with an application program running on the secondary computing device instead of using an interface input device connected to the secondary computing device to interact with the application program, wherein input is transmitted across a physical connector cable from the primary computing device to the secondary computing device, wherein the input is interpreted by a device driver on the primary computing device prior to transmission, wherein when the primary computing device is in the second state, in addition to redirecting the interpreted input by the interface input control program to the secondary computing device, directing the interpreted input to the operating system of the primary computing device for further handling, and wherein redirecting the interpreted input further comprises:

computer usable program code configured to intercept the input as said input is being conveyed from the device driver to the operating system of the primary computing device; and computer usable program code configured to convey the intercepted input to the communications port of the primary computing device to which the physical connector cable is connected.

16. The computer program product of claim 15, further comprising:

computer usable program code configured to monitor the input generated by the at least one interface input device of the primary computing device;

computer usable program code configured to identify the input as the unique interface trigger;

computer usable program code configured to switch an input state of the primary computing device, wherein said switch results in at least one of moving the primary computing device from the first input state to the second input state and moving the primary computing device from the second input state to the first input state; and computer usable program code configured to use the at least one interface input device of the primary computing device to enter a power on password to the secondary computing device.

17. The computer program product of claim 16, wherein identifying of the input further comprises:

computer usable program code configured to request confirmation for the switch in input state of the primary computing device;

computer usable program code configured to, when confirmation of the input state switch is received, proceed with the switching of the input state of the primary computing device; and computer usable program code configured to, when rejection of the input state switch is received, dismiss the identification of the unique interface trigger, wherein the input state of the primary computing device remains unchanged.

18. The computer program product of claim 15, wherein, when a data type of the interpreted input is different from the data type of the communications port to which the physical connector cable is connected, redirecting of the interpreted input further comprises:

computer usable program code configured to identify a difference in a data type of the input and the data type of the communications port to which the physical connector cable is connected; and computer usable program code configured to convert the input to the data type required by the communications port of the physical connector cable.

19. The computer program product of claim 15, wherein, when configuring of the interface input control program allows definition of a secondary unique interface trigger that switches the primary computing device to a third input state from the first or second input state, said method further comprising:

computer usable program code configured to, when the primary computing device is in a third input state representing simultaneous local and remote use of the at least one interface input device, directing of the interpreted input to the operating systems of the primary computing device and the secondary computing device, wherein said interpreted input is simultaneously executed on both computing devices.

* * * * *